(12) United States Patent
Murphy et al.

(10) Patent No.: US 9,594,759 B2
(45) Date of Patent: Mar. 14, 2017

(54) BACKUP AND ARCHIVAL OF SELECTED ITEMS AS A COMPOSITE OBJECT

(75) Inventors: Elissa E.S. Murphy, Seattle, WA (US); Patrice Y. Simard, Bellevue (FR); Navjot Virk, Sammamish, WA (US); Kamal Jain, Bellevue, WA (US); Mathew J. Dickson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1043 days.

(21) Appl. No.: 12/485,328

(22) Filed: Jun. 16, 2009

(65) Prior Publication Data

US 2010/0318500 A1    Dec. 16, 2010

(51) Int. Cl.
| | | |
|---|---|---|
| G06F 7/00 | (2006.01) | |
| G06F 17/30 | (2006.01) | |
| G06F 11/14 | (2006.01) | |

(52) U.S. Cl.
CPC .... G06F 17/30073 (2013.01); G06F 11/1451 (2013.01)

(58) Field of Classification Search
CPC .......... G06F 17/30073; G06F 17/3089; G06F 17/3007; G06F 17/30076; G06F 17/30082; G06F 17/30292; G06F 17/30294; G06F 11/1451
See application file for complete search history.

(56) References Cited

U.S. PATENT DOCUMENTS

| | | | | |
|---|---|---|---|---|
| 5,411,806 | A * | 5/1995 | Dahlquist | 428/411.1 |
| 5,560,012 | A * | 9/1996 | Ryu et al. | 717/104 |
| 5,644,764 | A * | 7/1997 | Johnson | G06F 17/30607 |
| 5,742,813 | A | 4/1998 | Kavanagh et al. | |
| 5,857,182 | A * | 1/1999 | DeMichiel | G06F 17/30607 |
| 5,900,988 | A * | 5/1999 | Ohshita | 359/676 |
| 6,011,562 | A * | 1/2000 | Gagne et al. | 345/473 |
| 6,311,194 | B1 * | 10/2001 | Sheth | G06F 17/30595 |
| | | | | 707/E17.095 |
| 6,609,123 | B1 * | 8/2003 | Cazemier et al. | |
| 6,611,838 | B1 * | 8/2003 | Ignat et al. | |
| 6,625,624 | B1 * | 9/2003 | Chen | G06F 17/30902 |

(Continued)

OTHER PUBLICATIONS

Penedo, "A Project Master Database for Software Engineering Environments", IEEE 1985.*

(Continued)

*Primary Examiner* — Daniel Kuddus
(74) *Attorney, Agent, or Firm* — Steve Wight; Sandy Swain; Micky Minhas

(57) ABSTRACT

An archive of items, which are computing data accessed by a user, is created at a semantic object level. The object archiving may group seemingly disparate items as a composite object, which may then be stored to enable retrieval by the user at a later point in time. The composite object may include metadata from the various items to enable identifying the composite object and providing retrieval capabilities. In some aspects, an archiving process may extract item data from an item that is accessed by a computing device. Next, the item may be selected by a schema for inclusion in a composite object when the item data meets criteria specified in the schema. The composite object(s) may then be stored in an object store as an archive.

18 Claims, 11 Drawing Sheets

(56) References Cited

U.S. PATENT DOCUMENTS

| | | | |
|---|---|---|---|
| 6,662,188 B1* | 12/2003 | Rasmussen et al. | |
| 6,704,747 B1* | 3/2004 | Fong | G06F 17/30893 |
| 6,889,223 B2* | 5/2005 | Hattori | G06F 17/30938 |
| 7,194,482 B2* | 3/2007 | Larkin et al. | |
| 7,290,056 B1* | 10/2007 | McLaughlin, Jr. | 709/230 |
| 7,293,018 B2* | 11/2007 | Hattori et al. | |
| 7,530,672 B2* | 5/2009 | Kyoshima | 347/59 |
| 7,536,696 B2* | 5/2009 | Snover | G06F 9/45512 717/105 |
| 7,546,288 B2* | 6/2009 | Springer, Jr. | G06F 17/30616 |
| 7,555,412 B2* | 6/2009 | Nath | G06F 17/30864 345/589 |
| 7,587,670 B2* | 9/2009 | Snover | G06F 9/45512 715/234 |
| 7,590,672 B2* | 9/2009 | Slik | G06F 3/0605 |
| 7,685,083 B2* | 3/2010 | Fairweather | 706/45 |
| 7,769,769 B2* | 8/2010 | Rasmussen | G06Q 10/10 707/756 |
| 7,860,902 B2* | 12/2010 | Brendle | G06F 17/3056 707/809 |
| 7,933,891 B2* | 4/2011 | Larkin | G06Q 30/06 707/711 |
| 8,200,700 B2* | 6/2012 | Moore | G06F 17/30575 707/791 |
| 8,255,791 B2* | 8/2012 | Koren | G06F 11/3438 715/227 |
| 8,423,565 B2* | 4/2013 | Redlich | G06F 17/30395 707/758 |
| 8,468,244 B2* | 6/2013 | Redlich | G06Q 10/06 705/50 |
| 2003/0115545 A1* | 6/2003 | Hull et al. | 715/500 |
| 2004/0230572 A1* | 11/2004 | Omoigui | G06F 17/30528 |
| 2005/0198031 A1* | 9/2005 | Pezaris | H04L 12/588 |
| 2007/0100913 A1* | 5/2007 | Sumner | G06F 11/1453 |
| 2007/0112714 A1* | 5/2007 | Fairweather | 706/46 |
| 2008/0086475 A1 | 4/2008 | Kane | |
| 2008/0126404 A1* | 5/2008 | Slik | G06F 17/30174 |
| 2008/0172628 A1* | 7/2008 | Mehrotra | G06F 17/30997 715/771 |

OTHER PUBLICATIONS

Costilla, et al., "Semantic Web Digital Archive Integration", retrieved on Jan. 6, 2009 at http://ieeexplore.ieee.org/stamp/stamp.jsp?arnumber=01333470, Proceedings of the 15th International Workshop on Database and Expert Systems Application (DEXA 2004), 7 pages.

Geambasu, et al., "Organizing and Sharing Distributed Personal Web-Service Data", retrieved on Jan. 6, 2009 at http://www2008.org/papers/pdf/p755-geambasuA.pdf, WWW Apr. 21-25, 2008, Beijing, China, pp. 755-764.

Holmes et al, "Integrating Metadata Tools with the Data Services Archive to Provide Web-based Management of Large-Scale Scientific Simulation Data", retrieved on Jan. 6, 2009 at http://ieeexplore.ieee.org/stamp/stamp.jsp? arnumber=01299467, Proceedings of the 37th Annual Simulation Symposium (ANSS2004), 8 pages.

"Internet Screen Scraping", retrieved on Jan. 6, 2009 at http://vinaytech.wordpress.com/2008/12/20/internet-screen-scraping, Dec. 20, 2008, 4 pages.

Rao, et al., "A Proxy-Based Personal Web Archiving Service", retrieved on Jan. 6, 2009 at http://delivery.acm.org/10.1145/380000/371462/p61-rao.pdf?key1=371462&key2=9722421321&coll=GUIDE&dl=GUIDE&CFID=16712898&CFTOKEN=83728511, ACM SIGOPS Operating Systems Review, vol. 35, Issue 1, Jan. 2001, 12 pages.

"Service Provides Hosted Email Archiving", retrieved on Jan. 6, 2009 at http://news.thomasnet.com/fullstory/523564, Jul. 10, 2007, Amicus, Inc., Thomas Industrial NewsRoom, 5 pages.

* cited by examiner

BACKUP AND ARCHIVAL OF SELECTED ITEMS AS A COMPOSITE OBJECT

BACKGROUND

People use computers to perform an array of functions, such as access local files, surf the Internet (the Web), communicate with other people, watch videos, listen to music, and so forth. Often, people are concerned with loss of computing data (or simply "data"). To address this concern, people often archive (backup) their data using a number of different techniques. Some people individually select data to archive on a storage disk that is independent from a source storage disk that is used to initially access the data. Other users may use backup devices and/or services that archive the users' data without continuous user intervention, such as at a scheduled backup time. In some instances, the archive may be performed over a network to a remote location.

Often archived computing data is stored in a same manner as it exists on the source storage disk. In some situations, data that is related to corresponding data (e.g., email attachment and email text, etc.) may not be backed up in a same location, at a same time, or even at a same interval as the corresponding data.

In addition, some computing data is accessed via a network, such as Web data accessible on the Internet. A user may desire to selectively archive the Web data to enable retrieval of the Web data at a later point in time. However, archiving Web data is difficult because Web data is often dynamic, may include large files, often does not include consistent naming conventions and semantic construction, and for other similar reasons. Thus, Web data may complicate selective archiving and retrieval of the data using traditional techniques.

Finally, users are often bombarded with user requests when computing. A presentation of additional dialog boxes or other user requests often annoy users and distract the users from pending tasks, which may result in a loss of productivity, user frustration, or other undesirable outcomes.

SUMMARY

An archive of items, which are computing data accessed by a user, is created at a semantic object level. The object archiving may group seemingly disparate items as a composite object or group of composite objects, which may then be stored to enable retrieval by the user at a later point in time. The composite object may include metadata from the various items to enable identifying the composite object, providing retrieval capabilities (e.g., search, etc.), and so forth.

In some aspects, a schema agent may extract item data from an item that is accessed by a computing device. The schema agent may select the item for inclusion in a composite object based on a schema when the item data is included in instructions of the schema. The schema agent may also identify metadata and/or attributes of the items, which may be stored with the composite object and used for identification and retrieval of the composite object. In some aspects, the schema may also construct composite objects based on characteristics of the data, such as by using either machine learning based approaches, wisdom of crowds for categorization, or simply heuristics.

In further aspects, the composite object may be stored in an object store, locally and/or remotely. A policy engine may determine storage options for the items in the composite object, which may include duplicating the items, moving the items from an original location, or creating a pointer to the item's original location. The policy engine may also remove item redundancy in the object store. The object store may be a backup of the original objects, in context, which may allow recovery of the objects upon request.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
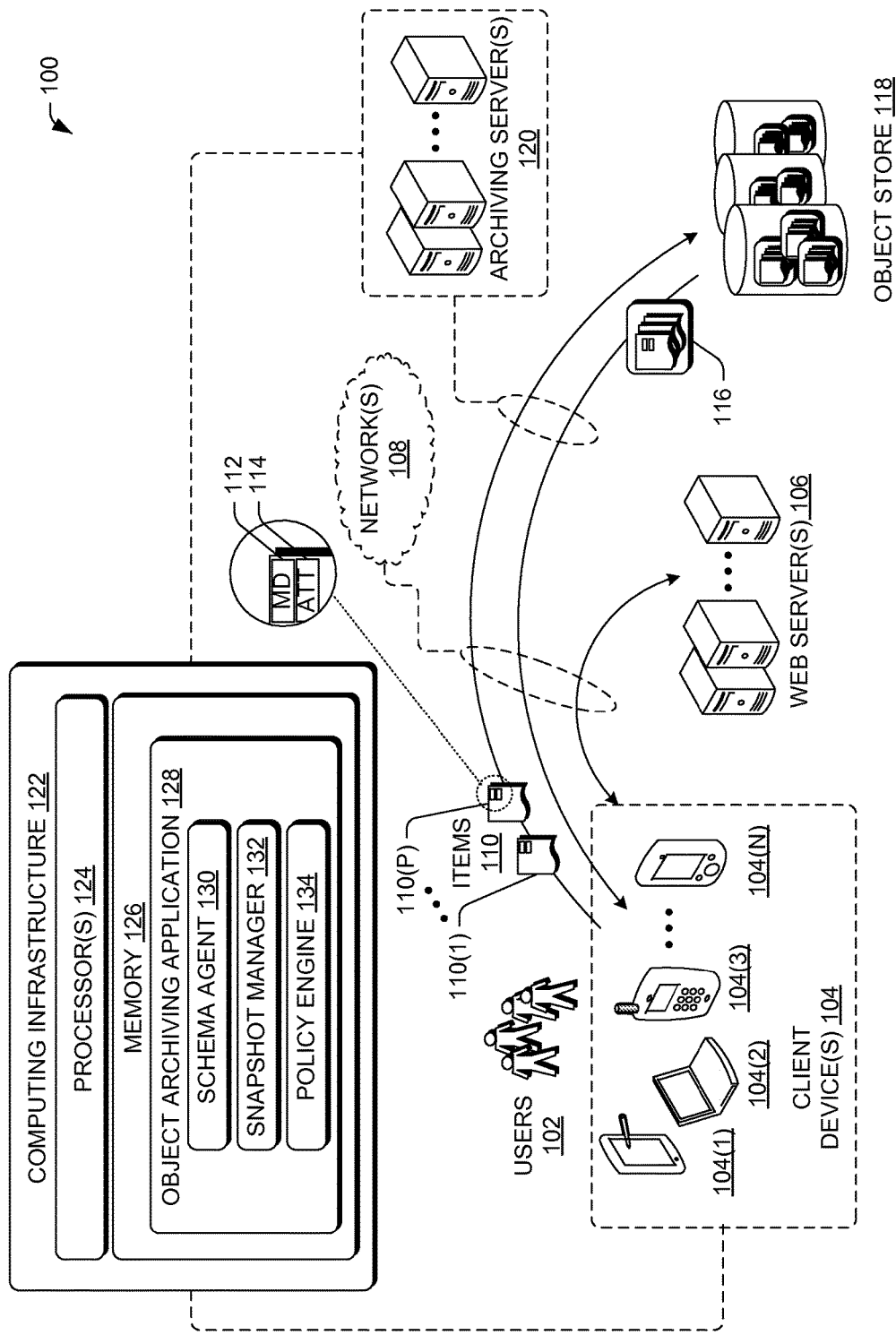
FIG. 1 is a schematic diagram of an illustrative architecture that may be used to enable archiving selected items as composite objects.

As discussed above, archiving data may be important to enable users to secure data for retrieval at a later point in time. In some embodiments, an archiving system may enable a user to archive data that is accessible via multiples data sources (fixed disk, peer to peer (P2P), on the Web, etc.). In addition, the archiving system may minimize user interaction by selecting items (data) to archive without (or with minimal) user input. In some embodiments, the archiving system may group items that are related to one-another at a semantic object level based on time intervals, data access processes, and/or semantic similarities such as, without limitation, email, favorites, contacts, tasks, calendar events, and so forth. In this way, related items may be archived together as a composite object. In some embodiments, the items in the composite object may be archived at substantially the same time and archiving interval.

As disclosed herein, archiving items (e.g., documents, images, web content, etc.) that are accessed by a user is performed at a semantic object level. Semantic object level archiving may be one level up from (i.e., at a less granular level than) traditional data archiving, which is performed by making identical copies of items at a data source level (e.g., files, folders, etc.). The object archiving may group seemingly disparate items as a composite object, which may then be archived to enable retrieval by the user at a later point in time. The composite object may include metadata from the various items to enable identifying the composite object, providing retrieval capabilities (e.g., search, etc.), and so forth.

In some embodiments, the archiving system may employ schemas as criteria for a selection of items for inclusion in the composite object. The schemas by implemented by a scheme service that includes some items in the composite object and exclude other items by implementing various instructions of the schemas. The instructions may enable selection of the items with minimal or no user interaction. The instructions of the schemas may be predefined, formed by aggregating preferences from other users (e.g., wisdom of the crowd), or defined by customization (e.g., user defined ahead of time).

In various embodiments, a policy engine may archive the composite object in a storage device for later retrieval. The policy engine may determine how to store each item of the composite object. For example, some items may be archived by duplicating the item, moving the item from the source to the archive location, creating a pointer to the item at its source location, using compression, and/or performing data integrity operations to generate consistency of the composite object (and data within). The policy engine may also perform other operations such as identifying and reducing redundancy of archiving items of the composite objects.

The processes and systems described herein may be implemented in a number of ways. Example implementations are provided below with reference to the following figures.

Illustrative Environment

FIG. 1 is a schematic diagram of an illustrative architecture 100 that may used to enable archiving selected items as composite objects. The architecture 100 may include users 102 having one or more associated client devices 104 (or simply "clients"). The clients 104 may be any type of computing device that is enabled to access data (content) as items. A non-exhaustive list of possible clients 104(1)-(n) may include a personal digital assistant 104(1), a personal computer 104(2), a mobile telephone 104(3), and a music player 104(n). As disclosed herein, any reference to the client 104 shall be interpreted to include any one of the clients 104(1)-(n).

The clients 104 may access data locally (e.g., from memory of the client 104, etc.) and/or remotely (e.g., from web servers 106 via network(s) 108). The network(s) 108 may include one or more of wired or wireless networks including wide area networks (WANs), local area networks (LANs), and/or personal area networks (PANs). A non-exhaustive list of example types of networks includes Wi-Fi, mobile telephone, Bluetooth® or other network types.

As the users 102 interact with the clients 104, items 110 may be created as discrete instances of data. The items 110 may include any content that is accessible by the clients 104 such as, for example, web data from the web servers 106 (e.g., websites, downloaded content, streamed data, etc.) local data from the client 104 (e.g., documents, images, video, audio, voice communications, etc.), and so forth.

Each of the items 110 may include various metadata 112 and/or attributes 114 that describe the item. For example, the metadata 112 may include a date of data creation/modification, file type, image size, resolution, etc. The attributes 114 may include additional information about the item 110 that may or may not be stored in the metadata, but that is discoverable by analyzing the item. For example, the attributes may include a file size, storage location, etc.

As one of the users 102 interacts with the client 104, various items 110 may be selected for archiving based on a schema (set of instructions). The schema may be implemented by a schema agent to select different items, such as item 110(1), ..., 110(P) based on a set of instructions, which will be discussed in more detail below. The items 110 may be associated as a composite object 116, which may be ultimately archived to enable user retrieval at a later point in time.

The composite object 116 is defined by the schema and contains information about the various items 110(1)-(P) that are included in the composite object. For example, the composite object 116 may be created by a schema that selects items associated with an email application. In that case, the composite object 116 may include a first item that is an email message, a second item that is linked data from the email message, a third item that is contact information for a recipient of the email (e.g., phone, home address, email address, etc.), and a fourth item may include a note created by a notation app that is used to scribble notations over the email interface (e.g., using a stylus). These items may be bundled together as one example of the composite object 116, archived in an object store 118, and retrieved by one of the users 110 at a later point in time. Unlike conventional data storage, the composite object 116 may compile disparate instances of data (the items 110) together as contextual data in the composite object that may be archived in the object store 118.

In some embodiments, the architecture 100 may include archiving server(s) 120 that are in communication with the clients 104 via the network(s) 108. The archiving servers 120 may monitor computing activities of the clients 104 to identify and select the items 110 and create the composite object 116 with the items based on the schema. When the archiving servers 120 are included in the architecture 100, the object store 118 may be located with the archiving servers 120 or otherwise remote from the clients 104. In other embodiments, the clients may identify and select the items 110 and create the composite object 116 with the items based on the schema. The object store 118 may be located with the clients or in a location that is remote (separate) from the clients.

As illustrated, the clients 104 and/or the archiving server(s) 120 may be equipped with a computing infrastructure 122 to enable the clients 104 and/or the archiving servers 120 to archive selected ones of the items 110 as the composite object 116. The computing infrastructure 122 may include one or more processors 124 and memory 126 that is accessible by the processors 124. The memory 126 may include applications, modules, and/or data. In some embodiments, the memory 126 may include an object archiving application (OAA) 128. The OAA 128 may be an application with one or more additional components that may archive selected items as the composite object 116 as disclosed herein.

In some embodiments, the OAA 128 may include a schema agent 130 to implement the schema. The schema agent 130 may identify the items 110 that are accessed by the users 102 via the clients 104. The schema agent 130 may then select one or more of the items 110 for inclusion in the composite object 116, which may be archived in the object store 118. In various embodiments, the schema agent 130 may include instructions (schema) that determine when to select the items and define aspects of the composite objects 116. The instructions may be predefined, formed by aggregating preferences from other users (e.g., wisdom of the crowd), and/or defined by customization (e.g., user defined). In some embodiments, the OAA 128 may employ optimization technology to compress, single instance or some other mechanism to save space in the object store. The OAA 128 may further perform data integrity operations during the archiving process.

In various embodiments, the OAA 128 may include a snapshot manager 132 to create a snapshot of data as one of the items 110. The snapshot manager 132 may be used to generate an image, text, or other types of data from content accessed by the users 102 (a snapshot of data at a point in time (the aggregated data). For example, the snapshot manager 132 may capture web browsing history by capturing screenshots of web pages viewed by a user. The snapshot manager may also capture changes to the objects at the high level as events are occurring on a computer (e.g. when a file is saved, the semantic data is also saved along with events scheduled). The snapshot may be stored as an image or other type of data and added to the composite object 116. The snapshot manager 132 may also obtain metadata for the generated data, which may be used to identify and/or retrieve the item.

In some embodiments, the OAA 128 may include a policy engine 134. The policy engine 134 may enable archiving the composite object 116 in the object store 118. In some embodiments, the policy engine 134 may determine how to store the items 110 of the composite object 116, such as by duplicating the item, moving the item from the source to the archive location, performing compression/optimizing, performing data integrity, and/or creating a pointer to the item at its source location.

The computing infrastructure 122 may be wholly implemented on one or both of the clients 104 and/or the archiving servers 120 to perform the various functions described above. In some embodiments, portions of the object archiving application 128 may be implemented (shared or divided) among the clients 104 and the archiving servers 120 to perform archiving selected items as a composite object. For example, in one configuration, the clients 104 may include the schema agent 130 and may select the items 110 for inclusion in the composite object 116. The composite object 116 may then be analyzed by the policy engine 134 executed by the archiving servers 120, which ultimately access the object store 118 to archive the composite objects 116. In another example, the clients 104 may include the entire computing infrastructure 122 and have direct access to the object store 118 (that may be local or remote from the clients). Other configurations are contemplated which allocate tasks (processing) between the clients 104 and the archiving servers 120.

Figure 2:
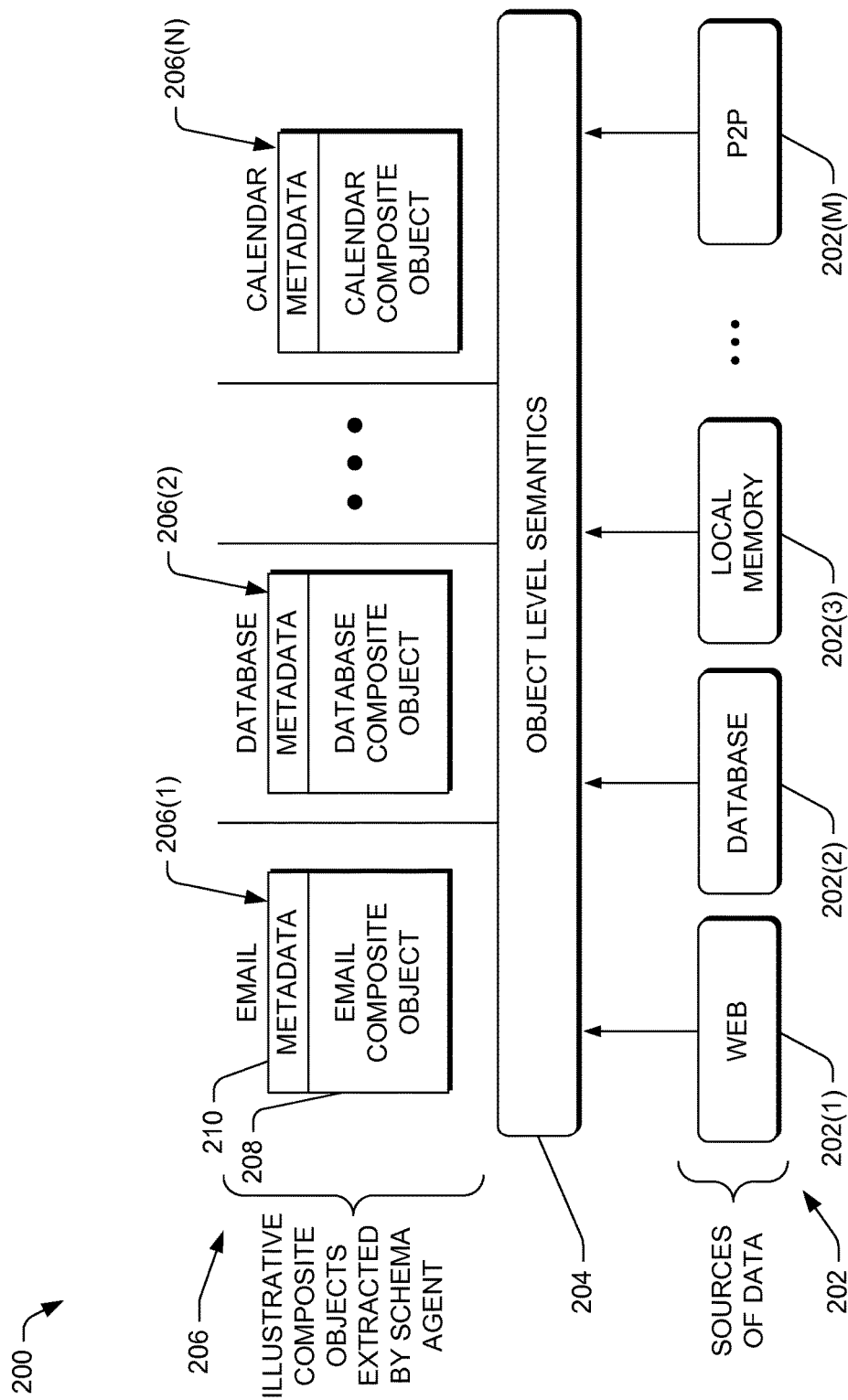
FIG. 2 is a block diagram showing an illustrative arrangement of composite objects extracted by schemas and residing in an object level semantics layer constructed from a data source layer.

FIG. 2 is a block diagram 200 showing an illustrative arrangement of composite objects extracted by schemas and residing in an object level semantics layer above a data source layer. The diagram 200 includes a data source layer 202 situated below an object level semantics layer 204. The data source layer 202 may include data from various sources such as the Web, 202(1), a database 202(2), local memory 202(3), and/or other peers on a peer-to-peer network 202(M). The data source layer 202 may include computing data (items 110) as stored in a pre-archival state. Some of the data in the data source layer 202 may be related to other instances of data in the data source layer, which is not reflected in the data storage at this conventional level of data storage.

Each of the various sources 202(1)-(M) of the data source layer 202 may be examined from the object level semantics layer 204, which includes various object level schemas 206. Each of the schemas 206 may include instructions for identifying the items that originate from the data source layer 202. The schemas 206 may select items based on instructions to include the items in one or more composite objects. A first object level schema 206(1) may include items related to an email application, which ultimately forms an email based composite object 208 that includes disparate items extracted from various locations in the data source layer 202. The composite object 208 may include a metadata layer 210 that includes information to identify the composite object and/or retrieve the composite object. Additional object level schemas 206(2)-206(N) may be included in the object level schemas, where each object level schema is configured to create composite objects by selecting items based on a set of instructions.

As an example, the object level schema 206(N) may include instructions that create items associated with a calendar schema. A user may interact with a calendar event by manipulating computing data to create items, such as via the mobile telephone client 104(3). The activities associated with the calendar event may then be archived together as the composite object 116. The items 110 may include, without limitation, calendar information, attachments, attendee information (outlook properties, etc.), web services accessed during the event, voice over internet protocol (VoIP) communication used during the event, and so forth. Rather than just trying to capture the data, the composite objects stores data as "life streaming" (what the user is doing at any particular time, at a higher level than file/folder). Thus, the composite objects enable archiving a person's events as captured by interaction with a computer, the web, etc.

Figure 3:
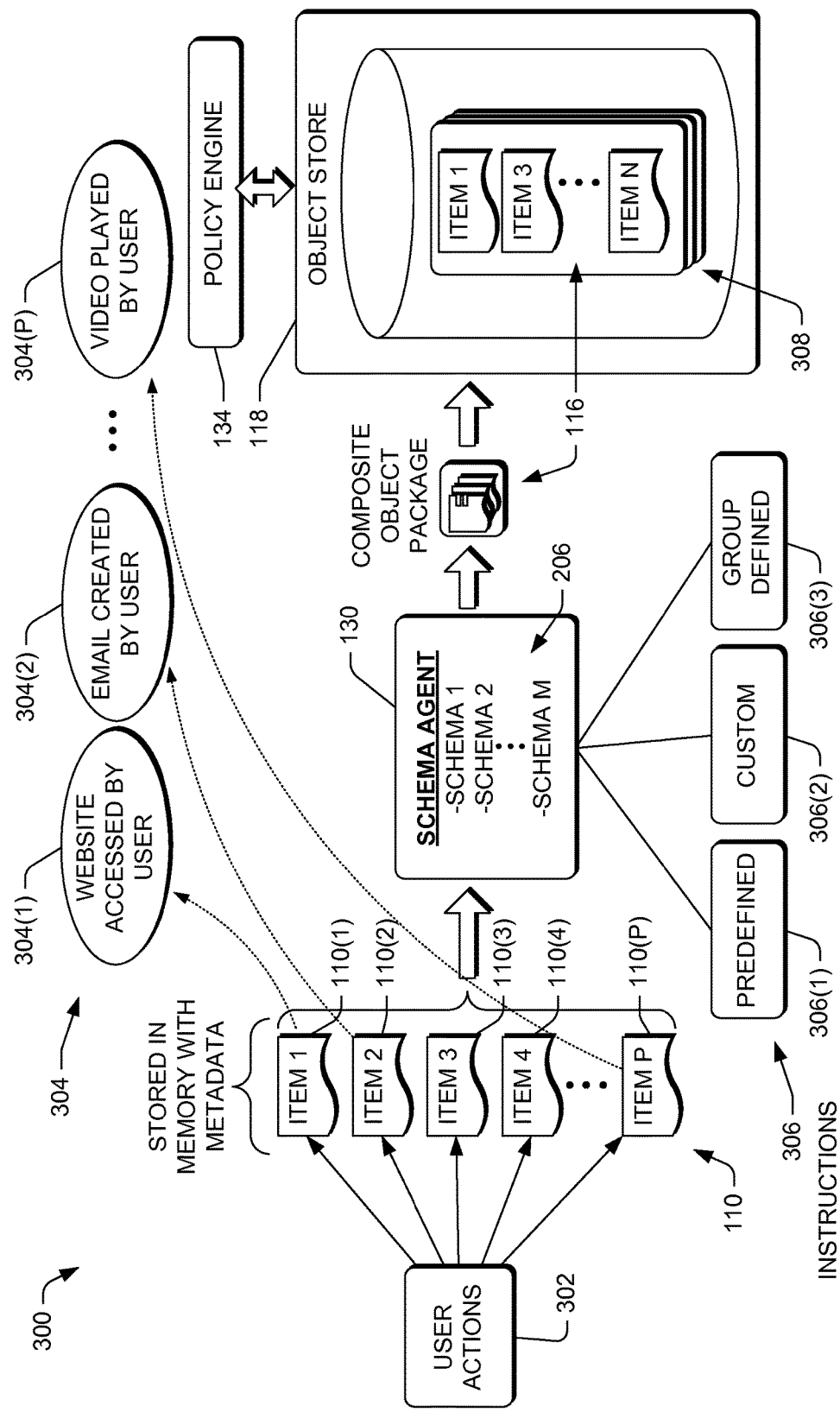
FIG. 3 is a block diagram showing illustrative user-accessed items that are selected by a schema agent and stored as a composite object in an object store.

FIG. 3 is a block diagram 300 showing illustrative user-accessed items that are selected by a schema agent and stored as a composite object in an object store. User actions 302 may be performed by manipulating one of the clients 104 to perform various computing activities involving data (content) that can be designated as one of the items 110.

Each of the items 110(1)-(P) may represent various data that is accessible from the data source layer 202. The items 110 may be described by various illustrative actions 304(1)-(P), which are associated with the items 110(1)-(P), respectively. Although all of the items 110 have a corresponding action, only some of the actions 304 are depicted in FIG. 3. Examples of the actions 304 may include a website (or websites) accessed by one of the users 102 as 304(1), an email created by a user as 304(2), . . . , and a video played by a user at 304(P). Other actions may include posting of photos and comments, which may be posted over time for each photo. Each of the actions 304 may be analyzed by the schema agent 130 by processing various instructions 306 to select the items 110.

The instructions 306 define the schema 206 and may include one or more of predefined instructions 306(1), custom instructions 306(2), and/or group defined instructions 306(3). The predefined instructions 306(1) may be instructions for selecting one of the items 110 and creating the composite object 116 that are universal, or default, thus accessible by the users 102 of the archiving service. The custom instructions 306(2) may be user defined instructions or otherwise modified instructions that may or may not share properties or an origin with the predefined instructions 306(1). For example, the custom instructions 306(2) may be created by a user-selection of various predefined instructions in a template that enables the user to specify which elements are included/excluded in the custom instructions rather than creating instructions without a template. The group defined instructions 306(3) may be formed by aggregating preferences or recommended schemas from other users to obtain "wisdom of the crowd." For example, the group defined instructions 306(3) may be created by selecting popular user defined instructions stored as the custom instructions 306(2).

In some embodiments, the group defined instructions 306(3) may be generated via an ontological analysis of item grouping from other users that interact with one or more of the items 110 or other items of the same or similar data type as the items 110. In various embodiments, schema agent 130 may run as a web service and data may be aggregated and shared across a group of user of a system. The set of aggregated schemas (not really preferences) can be provided as a web service where users can have object schemas defined automatically or submitted as a group. In this way, the process may build a bottom's up ontology for the schema by watching (via the schema agent 130) user actions and submitting the actions to the web service. The schema can then be generated by using machine learning to look for common features (and creating a new schema) or simply by taking the common schemas that are either submitted or generated to the system and ensuring there is enough agreement across schema types that a new schema can be created.

The schema agent 130 may assemble the composite object 116 by selecting one or more of the items 110 for inclusion in the composite object. In some embodiments, the schema 206 may create the composite object 116 for an item, such as when one of the users 102 begins a new computing activity, and accesses an item included within the instructions 306 that are implemented by the schema agent 130. In some embodiments, the composite object 116 may be packaged (created) by the client 104, while in other instances another device (e.g., the archiving servers 120, etc.) may package the composite object.

The policy engine 134 may receive the composite object 116 and archive the composite object by interacting with the object store 118. The composite object 116 may be stored in the object store 118 with other composite objects 306, which may be later retrieved by one or more of the users 102. In some embodiments, only a user that creates the composite object 116 is permitted to retrieve the composite object. As shown in FIG. 3, the composite object 116 includes only a portion of the items 110 as an item group 308 (e.g., items 1, 3, . . . , N), which are the items 110 that are selected by implementing the schema agent 130. Any non-selected items (e.g., item 2, etc.) may be disregarded and not stored in the object store 118 and/or not associated with the composite object 116.

Illustrative Operation

Figure 4A:
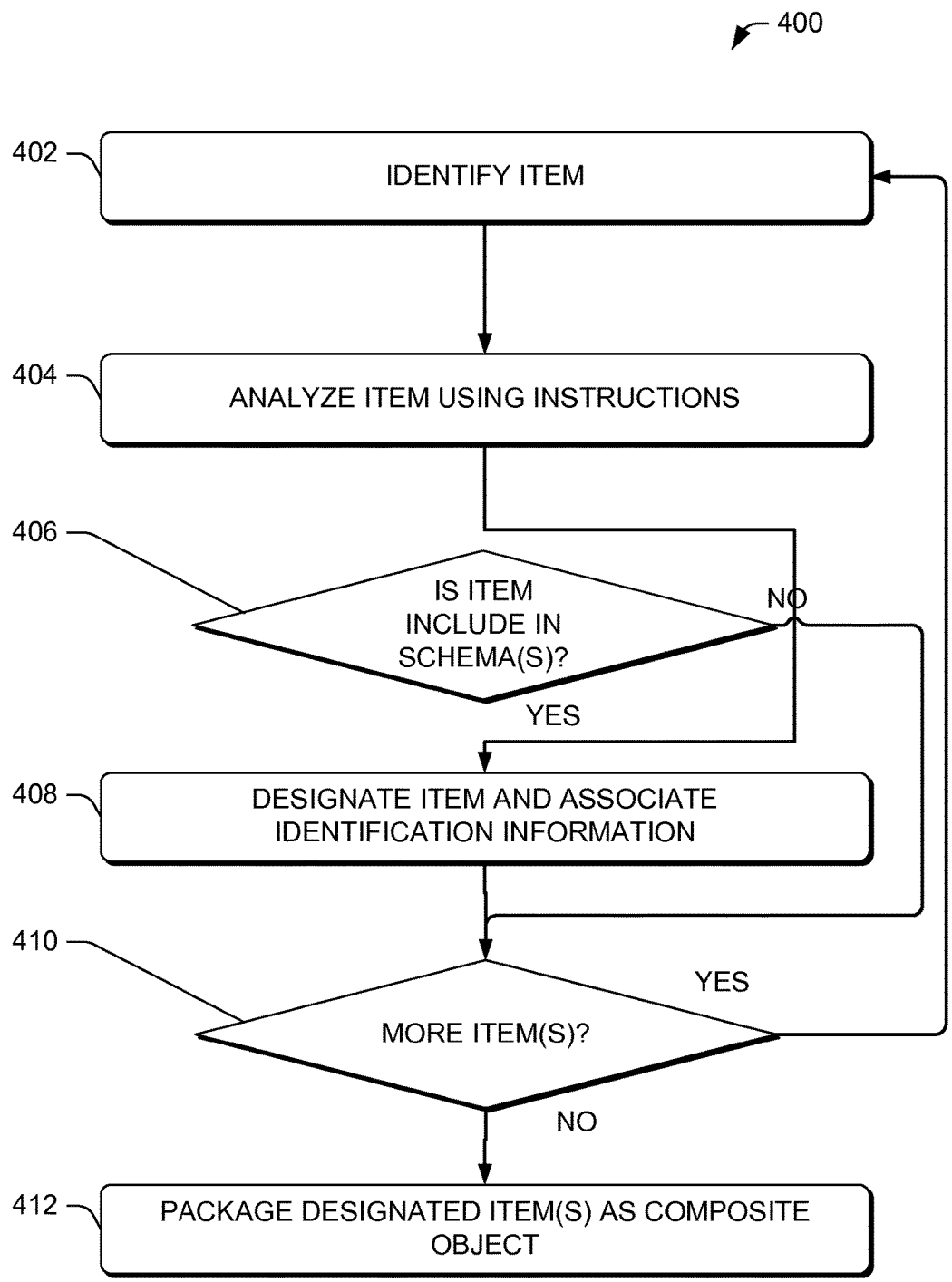
FIG. 4A is a flow diagram of an illustrative process to identify items in a composite object and batch process the items in the composite object.
Figure 4B:
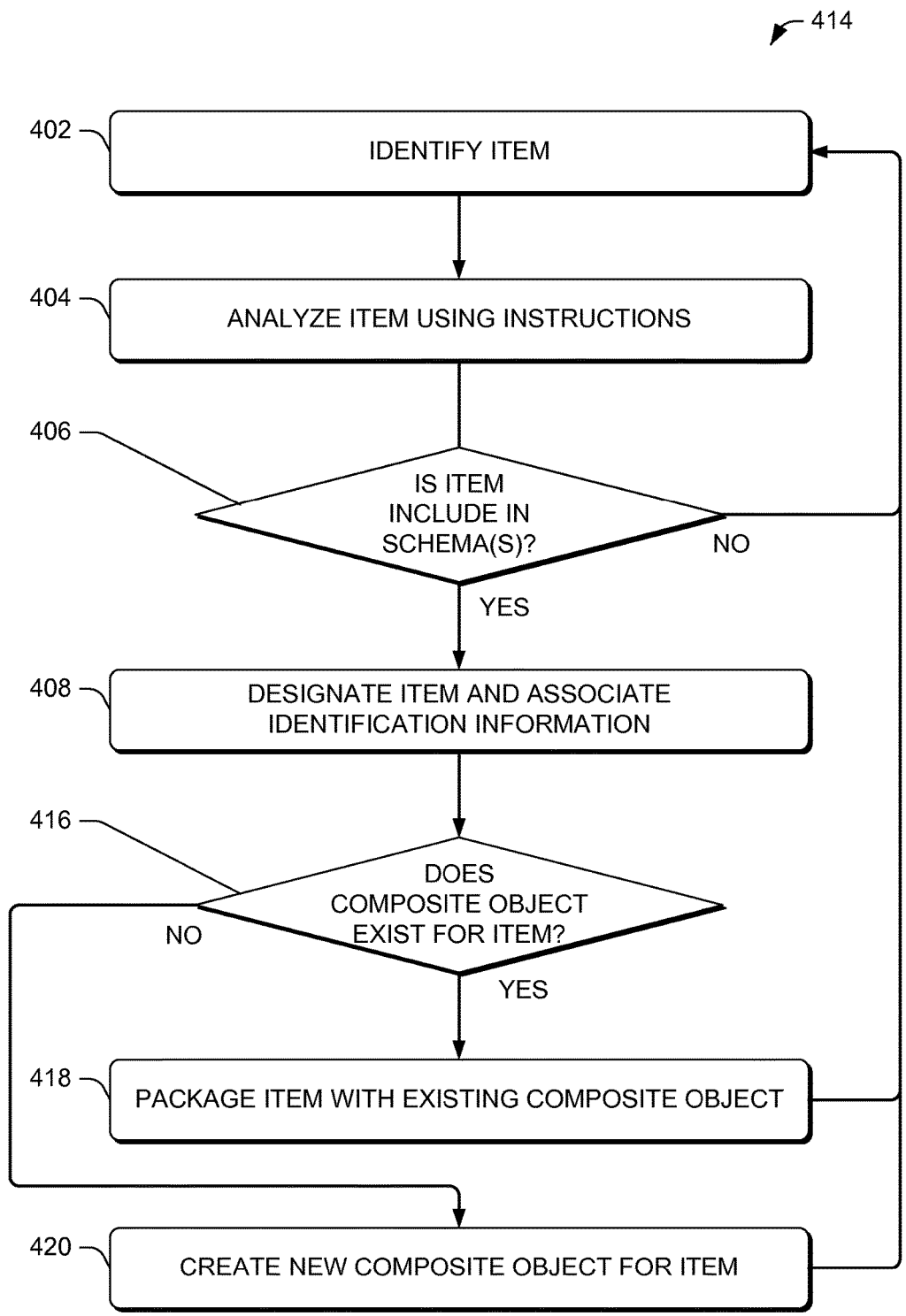
FIG. 4B is a flow diagram of another illustrative process to identify items in a composite object and package the items in the composite object after identification of an item.
Figure 4C:
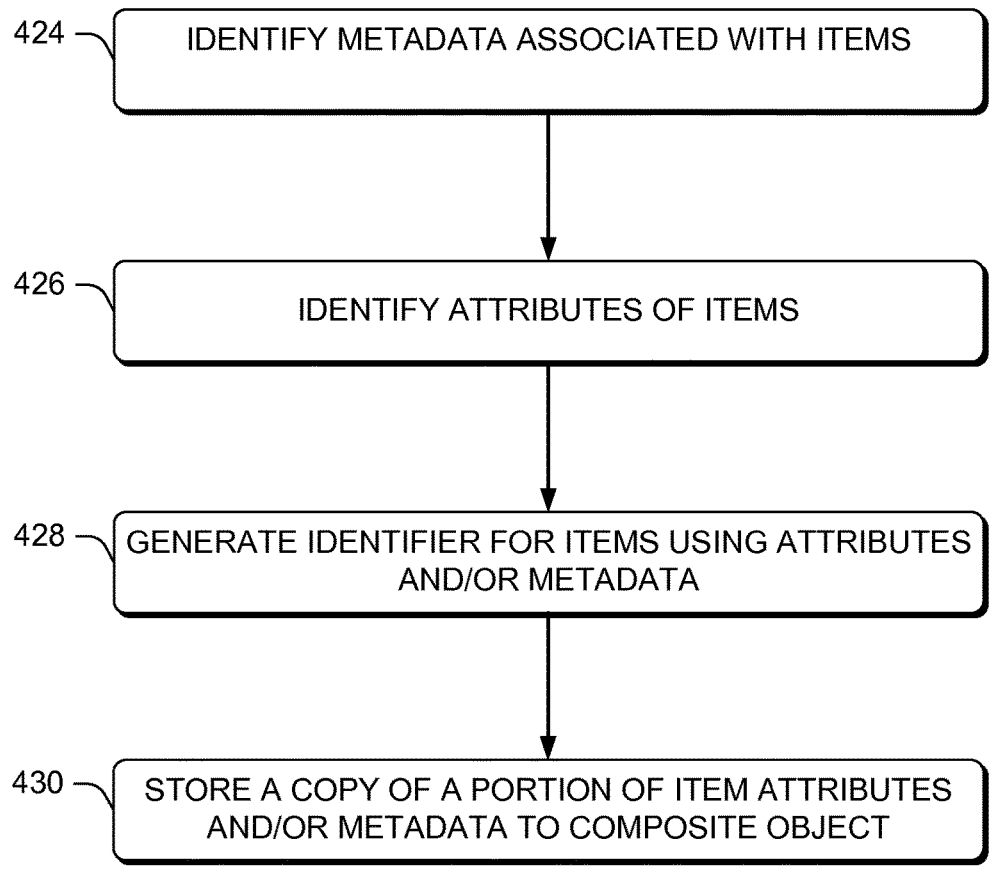
FIG. 4C is a flow diagram of an illustrative process to identify attributes and metadata for items.

FIGS. 4A, 4B, and 4C show processes that are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to the processes of FIGS. 4A-4C, should be interpreted accordingly. For discussion purposes, the processes of FIGS. 4A-4C are described with reference to the architecture 100 of FIG. 1. In particular, many acts described below may, but need not, be implemented and performed by the schema agent 130.

FIG. 4A is a flow diagram of an illustrative process 400 to identify items in a composite object 116 and batch process the items in the composite object. At 402, the schema agent 130 may identify one of the items 110. For example, a user may access various content (e.g., a website, local files, wireless data, etc.) via the clients 104. At least a portion of the content may be designated as an item. In some embodiments, the items may be identified by extracting item data from an item accessed by a computing device. The item data may include the metadata 112 and/or the attributes 114 of the item.

At 404, the schema agent 130 may perform an analysis of the item using the instructions 306. For example, the metadata 112, the attributes 114, or other information and/or relationships of the item may be compared with the instructions 306 to determine whether the item is included in a schema.

At 406, the schema agent 130 determines whether the item is to be included in a composite object based on the analysis at the operation 404. If the item is included in the instructions, then further operations may be performed on the item.

At 408, the schema agent 130 designates the item for inclusion in a composite object(s) and item information is associated with the item. For example, the item may be stored in cache or another memory location prior to inclusion in the composite object(s). The identification information may be generated from the metadata 112 and/or the attributes 114, and thus be named/identified without user input. In some embodiments, a user may provide a name/identifier for the item or set of items.

At 410, the schema agent 130 may continue to monitor user activity to determine whether additional items need processing. When an item is not included in the schemas at the decision operation 406, the process 400 may advance to the decision operation 410 for further processing of the items.

At 412, the schema agent 130 may package the designated items from the operation 408 as the composite object 116 when no additional items are processed at the decision operation 410. In some embodiments, the operation 412 may batch process all of the items selected at 406 in the composite object, or may only process a portion of the items at 412.

FIG. 4B is a flow diagram of another illustrative process 414 to identify items in a composite object and package the items in the composite object after identification of an item. Some of the operations of the process 414 may be similar or identical to those discussed with reference to the process 400, as indicated by having the same reference number, and will not be elaborated on with reference to FIG. 4B.

At 416, following the designation of the item as included in the instructions 306, the schema agent 130 may determine whether a composite object exists for packaging the item. When a composite object is identified at 416, the designated item may be packaged with the existing composite object at 418. However, when the composite object does not exist at 416, the schema agent 130 may create a new composite object for the item and then package the item in the new composite object at 420. In some instances, input for objects as events are happening (e.g., user interacting with a data via a computer) or input may be captured after creation of the object.

As an example, a user may perform a series of related computing activities using the client 104 to gather information prior to purchasing a car. Each of the activities may result in an identification of an item at 402. The user may look at reviews on the Web 202(1), dealership websites, access prices from a database (e.g., the database 202(2)), watch a video and so forth, which may create the items 110(1)-(P). The schema agent 130, by implementing the instructions 306, may store some of the items 110 as the composite object 116. The process 400 may create the composite object 116 at 412 by including multiple items that form the composite object using a batch creation process. In contrast, the process 414 may add the items to existing composite objects at 418, as appropriate, or create a new composite object when necessary at 420. It is contemplated that the schema agent 130 may add items to different composite objects by alternating between composite objects based on the analysis of the item at 406.

In another example, a photo site may be used to post photos uploaded from users. User may post the photo or photos up on the site at a specific time, then share it with other people. Eventually, some people may comment on the photos or tag people within the photo. The photos and/or comments may be archived as a composite object. The composite object may include a photo, the related comments, a timeline, and associated tags. During a restore of the archived composite object, the user may roll back to a specific event (e.g. the birthday party photos) and restore from that point. Each discrete element could be restored.

Later, the user may want to retrieve this information and continue the example research activity. By accessing the composite object 116, the user may continue the research while having at his/her disposal the prior research stored as the composite object 116 of the items 110(1)-(P). Some non-relevant activities (resulting in items) may be omitted from the composite object 116 as determined by the instructions 306 implemented by the service schema 130 at 406. For instance, in the example given above, a user may have taken a break from researching the car purchase to check their email. The schema may include instructions allowing the service schema 130 to discern that the email is not related to the car research and should be omitted from the composite object. The schema's operation may be transparent to the user such that the user does not have to continually make decisions (take action, etc.) on issues such as what to archive or what name (identifier) to archive an item with, and so forth.

FIG. 4C is a flow diagram of an illustrative process 422 to identify attributes and metadata for the items and/or the composite objects.

At 424, the schema agent 130 may identify the metadata 112 associated with the items 110. For example, the metadata 112 may include a date of data creation/modification, file type, image size, resolution, event type, data type, etc.

At 426, the schema agent 130 may identify the attributes 114 associated with the items 110. The attributes 114 may include additional information about the item 110 that may or may not be stored in the metadata but that is discoverable by examining the item. For example, the attributes may include a file size, storage location, website location, etc.

At 428, the schema agent 130 may generate an identifier for the items using the metadata 112 and/or the attributes 114. For example, a user may access an image on the Web that is one of the items 110 designated by the schema agent 130 for inclusion in the composite object 116. The item (image) may include a file name (metadata). The schema agent 130 may generate an identifier for the item that is more meaningful to the user for later retrieval. For example, the website source of the image (attribute), a resolution (metadata), caption (metadata), etc., may be used to generate an identifier (or name) which may be used to store the item and enable other activities such as retrieval (search, indexing, etc.).

At 430, the schema agent 130 may migrate at least a portion of the metadata 112 and/or the attributes 114 of the item to the composite object 116. In this way, the composite object 116 may be identified (named, etc.) by metadata/attributes of the items that the composite object includes. In addition, the composite object 116 may be retrieved (searched, categorized, schematized, etc.) using the migrated item information of the metadata 112 and/or the attributes 114.

Figure 5:
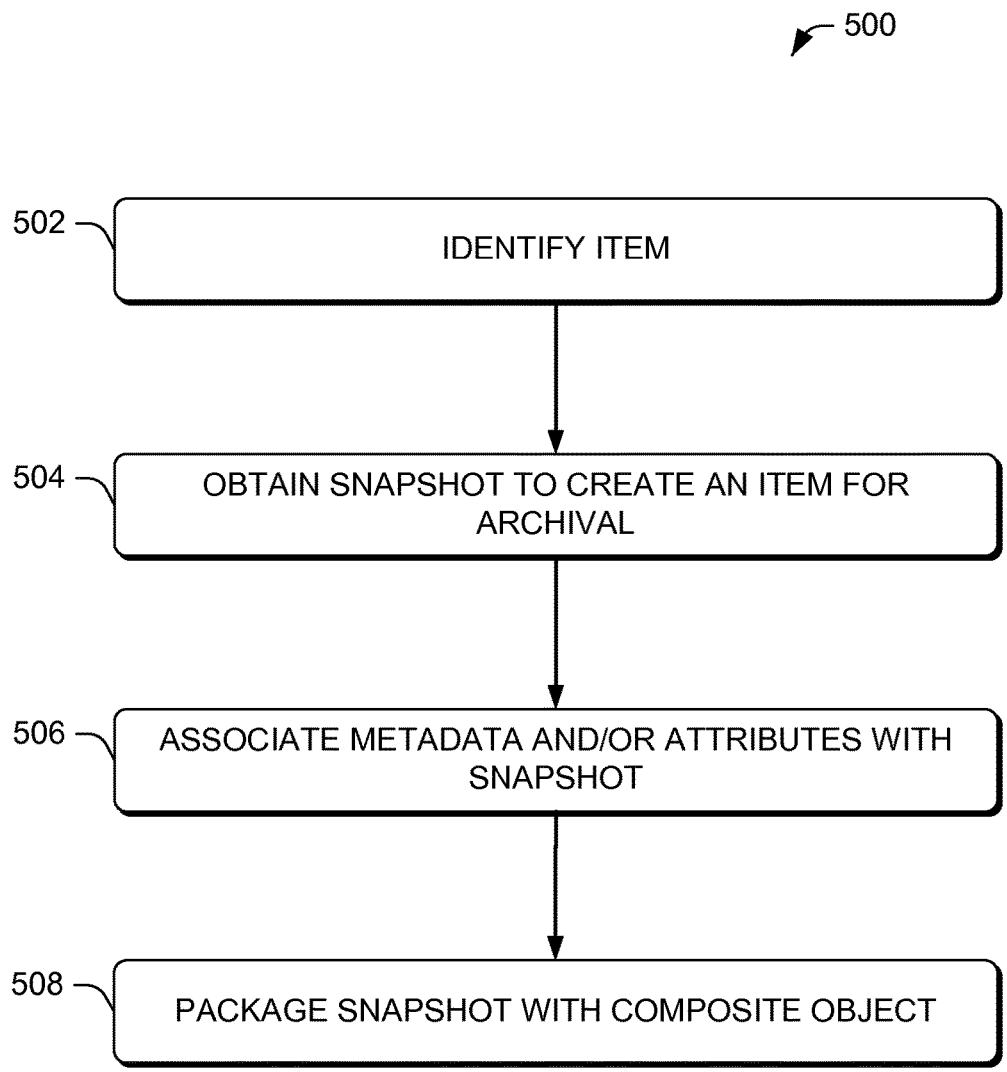
FIG. 5 is a flow diagram of an illustrative process to obtain a snapshot of data to create an item for inclusion in the composite object.

FIG. 5 is a flow diagram of an illustrative process 500 to obtain a snapshot of data to create an item for inclusion in the composite object. For discussion purposes, the process of FIG. 5 is described with reference to the architecture 100 of FIG. 1. In particular, many acts described below may, but need not, be implemented and performed by the snapshot manager 132. At 502, the schema agent 130 may identify an item based on the schema as discussed in reference to the operation 402.

At 504, the snapshot manager 132 may obtain a snapshot to create item(s) for archival. In some embodiments, the snapshot manager 132 may create an image file (e.g., bitmap, etc.), generate a screen scrape (identify text of the screen for storage as data other than an image), or a combination thereof.

At 506, the snapshot manager 132 may associate metadata and/or attributes with the snapshot obtained at 504. The metadata and/or attributes may include the data location (e.g., web address), access time, screen scrape (snapshot analysis) data, or other data associated with the snapshot. The metadata and/or attributes may be used to identify the snapshot as an item and/or to retrieve the item. Snapshots may enable obtaining a composite object automatically or on demand at any point in time. If a user wants to augment that at some later date, the system may only archive (or backup) incremental (delta) changes to the content.

At 508, the schema agent 130 may package the snapshot as the item with the composite object 116. The snapshot may then be retrieved with the composite object, as an item, set of objects, or sets of items, with other related items as determined by the schema agent 130.

Figure 6:
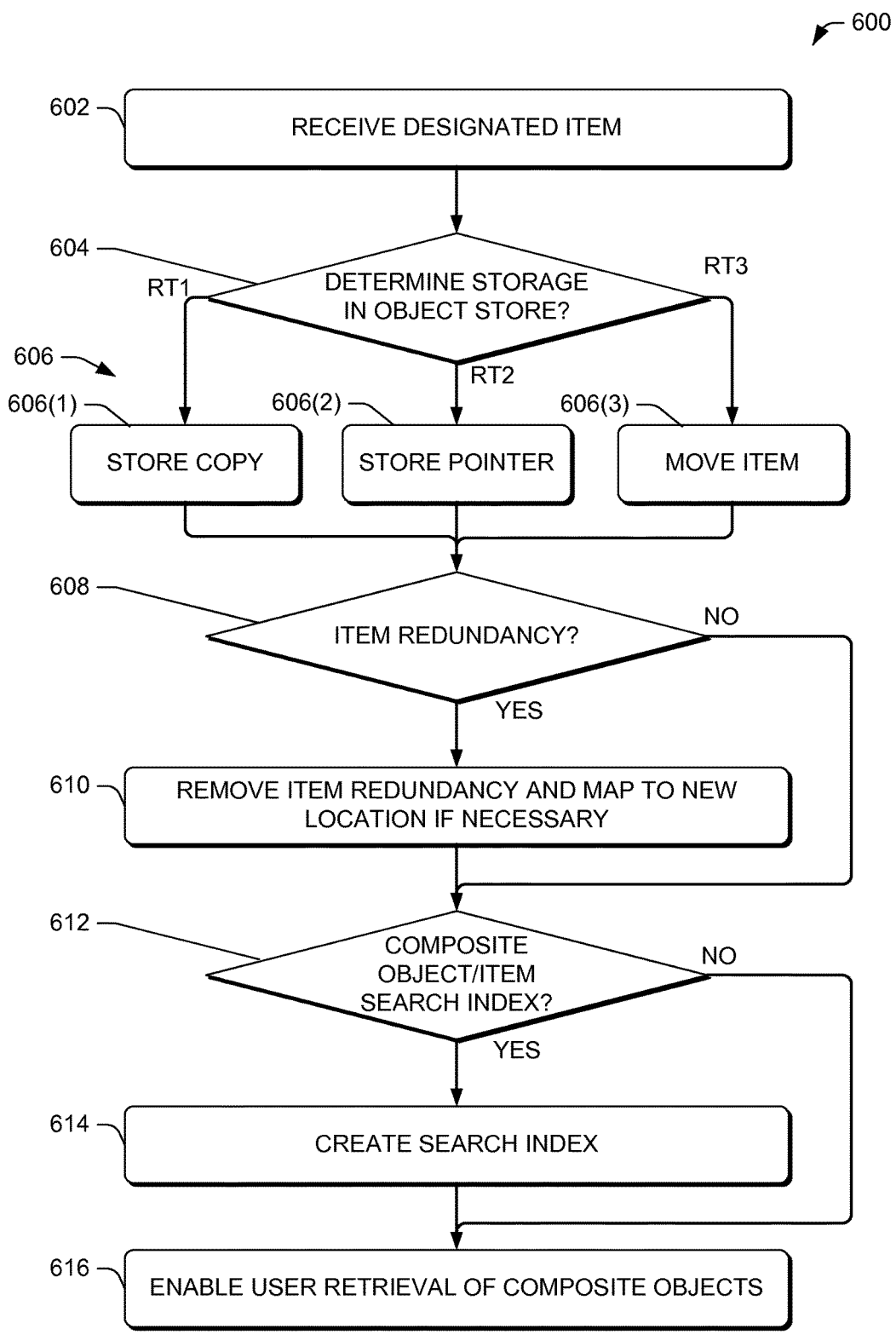
FIG. 6 is a flow diagram of an illustrative process to store items as a composite object using a policy engine.

FIG. 6 is a flow diagram of an illustrative process 600 to store items as a composite object using a policy engine. For discussion purposes, the process 600 of FIG. 6 is described with reference to the architecture 100 of FIG. 1. Again, the order in which the operations are described is not intended to be construed as a limitation, and any number of the described blocks can be combined in any order and/or in parallel to implement the process. In particular, many acts described below may, but need not, be implemented and performed by the policy engine 134.

At 602, the policy engine 134 may receive the designated item (e.g., the item 110 from the operation 408 as designated by the schema agent 130). In some embodiments, the designated item may be transmitted across the network 108 prior to receipt by the policy engine 134.

At 604, the policy engine 134 may determine how to store the item 110 in the object store 118. The item 110 may be stored in the object store at 606 based on the determination of the policy engine 134 at 604. The policy engine 134 may store the item 110 using any available route (RT).

Following a first route RT1, the policy engine 134 may store an archived (duplicate) copy of the item in the object store with the composite object 116. In some embodiments, the policy engine 134 may follow the first route RT1 as a default route.

Following a second route RT2, the policy engine 134 may determine to "store" the item by creating a pointer without creating an additional copy of the item that is separate from the source copy of the item of which the item originates. For example, the policy engine 134 may create a pointer to the item's original location rather than storing a duplicate copy of the item in the object store 118. In some aspects, the policy engine 134 may use compression and/or optimization when archiving objects. The composite object 116 may then include a pointer, the metadata 112, and the attributes 114 of the pointed-to item instead of the complete item (i.e., duplicate). In some embodiments, the policy engine 134 may follow the second route RT2 when the item is stored in an original location that is unlikely to change (static item), the item is a large file and may require substantial bandwidth to copy via the first route RT1, or for other reasons.

Following a third route RT3, the policy engine 134 may move the item 110 to the object store and delete an original copy to minimize storage space (particularly applicable when the object store is local to the client 104). In an example, a large email attachment may be archived as an item in the composite object 116 by moving the attachment to the object store and deleting the original attachment. The policy engine may also enable a user to selectively remove composite objects that are past a certain date of archiving (e.g., no longer relevant to the archived composite object). In some embodiments, the policy engine 134 may follow the third route RT3 when the item that is currently stored in an original location is no longer needed in the original location (more likely to be accessed via the composite object than via the original location), or for other reasons.

At 608, the policy engine 134 may determine whether to perform a redundancy check to see if the item has been previously archived. At 610, the redundancy check may be performed by the policy engine 134. When a redundancy is identified, an item with redundancy may be mapped to a new location and the redundant copy removed from the archive. In this way, two or more composite objects may share a same item, where one composite object may include the data of the item (i.e., duplicate copy) while the other composite objects may include a pointer to the duplicate copy. In some embodiments, the policy engine 134 may perform data integrity as the policy engine is running to ensure the composite object are consistent and do not contain errors.

At 612, the policy engine 134 may determine whether to create a composite object and/or item search index. At 614, the policy engine may create a search index, which may enable expedited or alternative techniques for retrieval of the composite object and/or items. The search index may be created as data is added to the composite object, or after the fact in a batch process. In some embodiments, the policy engine 134 may create the search index by indexing the metadata 112 and/or the attributes 114 at the item or composite object level to enable a search of the composite objects and/or the items.

At 616, the policy engine 134 may enable user retrieval of the composite objects. For example, the policy engine may enable access to the composite objects via a user interface, which may enable a user to selectively retrieve the composite object and items.

Figure 7:
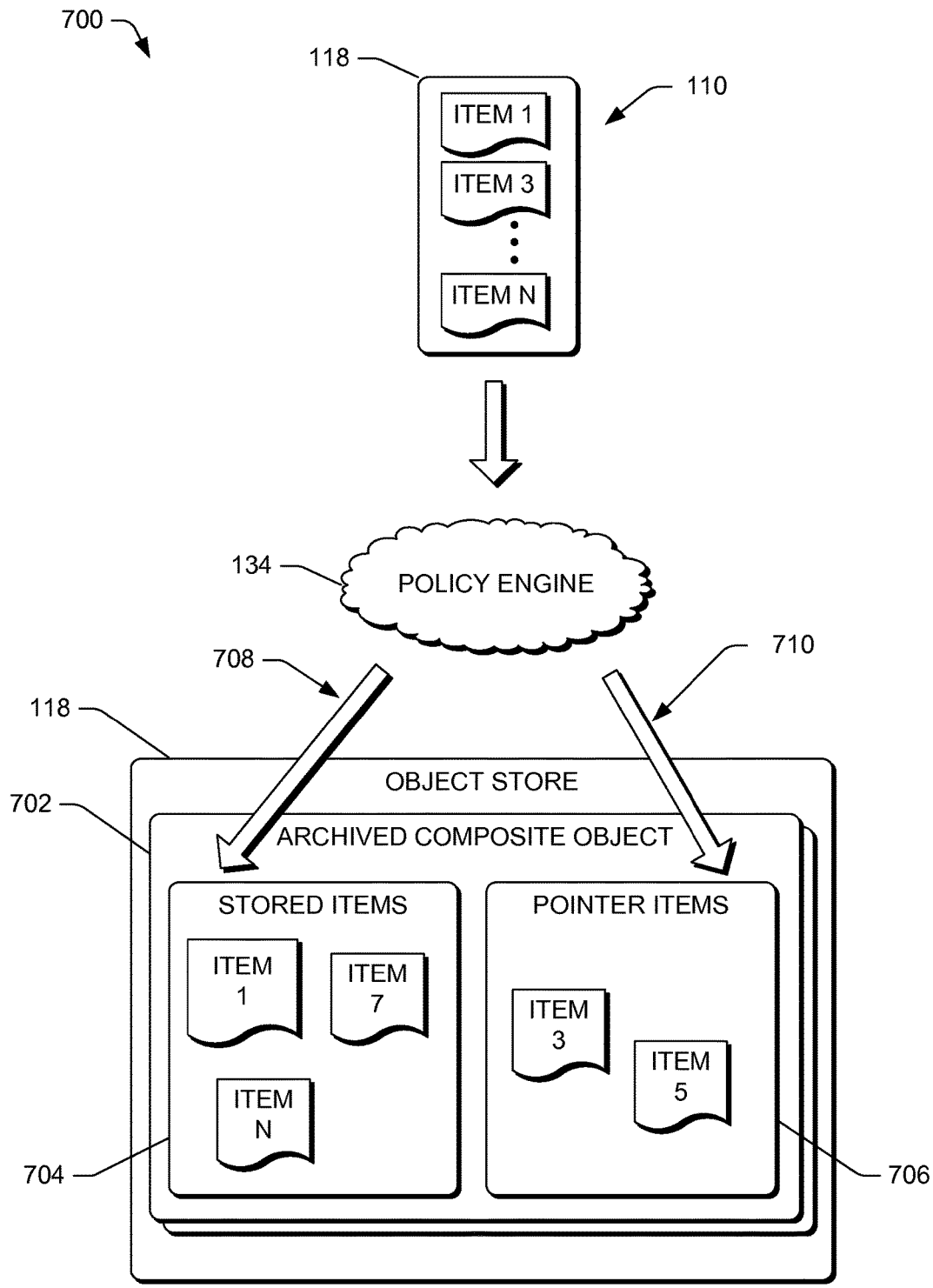
FIG. 7 is a block diagram of an illustrative process to store items as data or pointers in an object store.

FIG. 7 is a block diagram of an illustrative process 700 to store items as data or pointers in an object store. The policy engine 134 may receive the composite object 116 that includes the items 110 (e.g., the operation 602). The policy engine 134 may then determine how to store the composite object 116 as an archived composite object 702. The archived composite object may include some of the items as stored items 704 (i.e., duplicate copy and/or moved copy), while other items may be included as pointed-to items 706. Upon receiving the items 110 in the composite object 116, the policy engine 134 may route the items via a first route 708 to the stored items 704 or a second route 710 to the pointed-to items.

Figure 8:
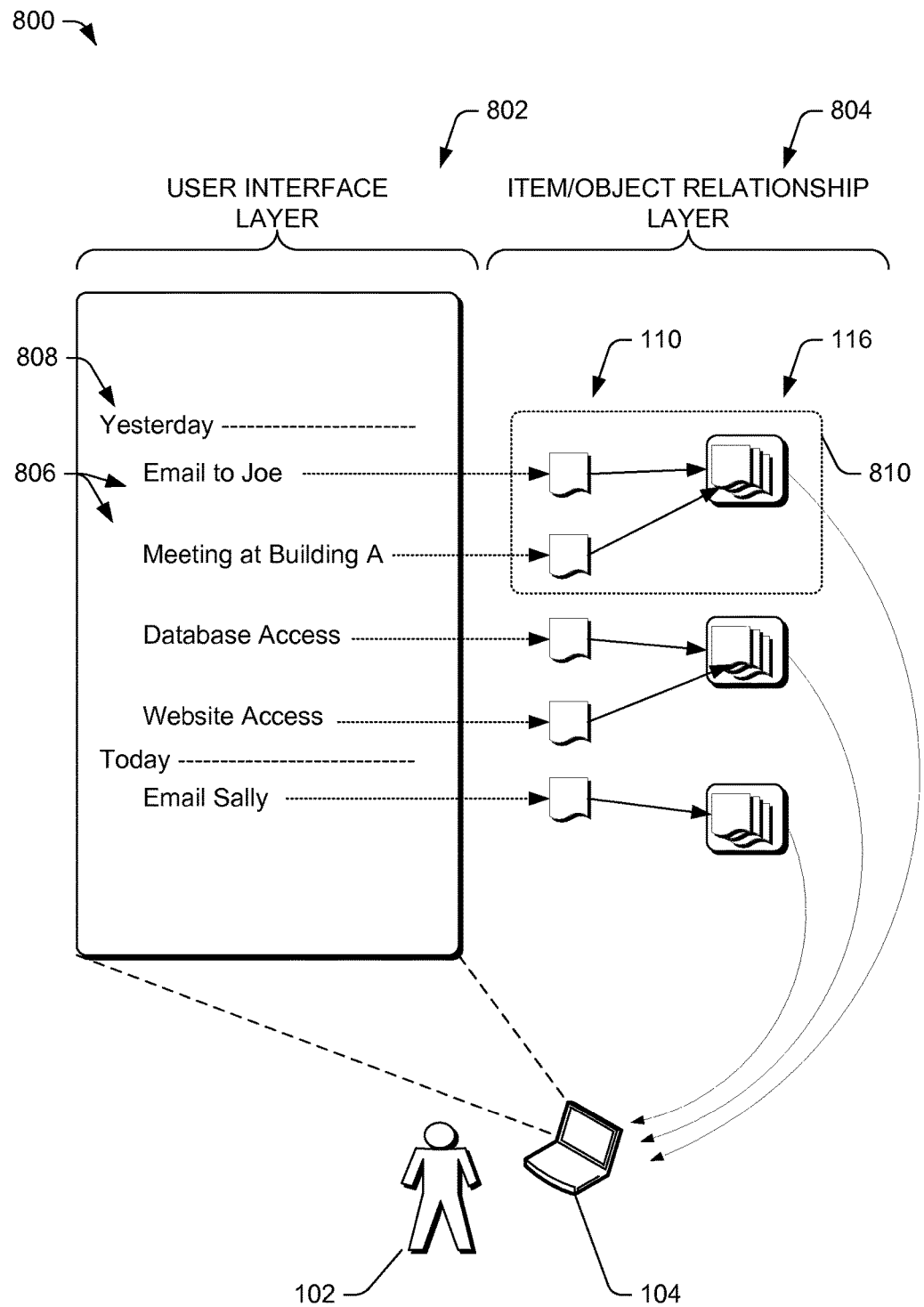
FIG. 8 is an illustrative user interface depicting one possible arrangement of items that are made available for retrieval from an archive of a composite object.

FIG. 8 is an illustrative user interface 800 depicting one possible arrangement of items that are made available for retrieval from an archive of a composite object. The user interface 800 is shown with a user interface layer 802 in connection with an item/composite object relationship layer ("relationship layer") 804 to represent an underlying data structure of archival of the composite objects 116.

The interface layer 802 may be manipulated by a user to select item links 806 that have been archived by the object archiving application (OAA) 128. The interface layer 802 may include timeline designators 808 to provide a timeline "feed" representation of the creation, storage, or other event associated with the items 110 represented by the item links 806. The users 102 may select the item links 806, such as by clicking on the item links 806 or by other techniques, and thus access corresponding items 110, which are archived as the composite objects 116.

The relationship layer 804 shows the items 110 mapped to corresponding instances of the composite objects 116. A mapped composite object 810 may include any number of related objects as defined by the schema agent 130. In some embodiments, the user 102 may access the composite object 116 and/or the items 110, as the mapped composite object 810, via the client 104. For example, the user 102 may click on one of the item links 806, which in turn may trigger the client 104 to provide user access to the mapped composite object 810, including access to the composite object 116 and/or the individual items of the items 110 associated with the composite object.

Illustrative Computing Device

Figure 9:
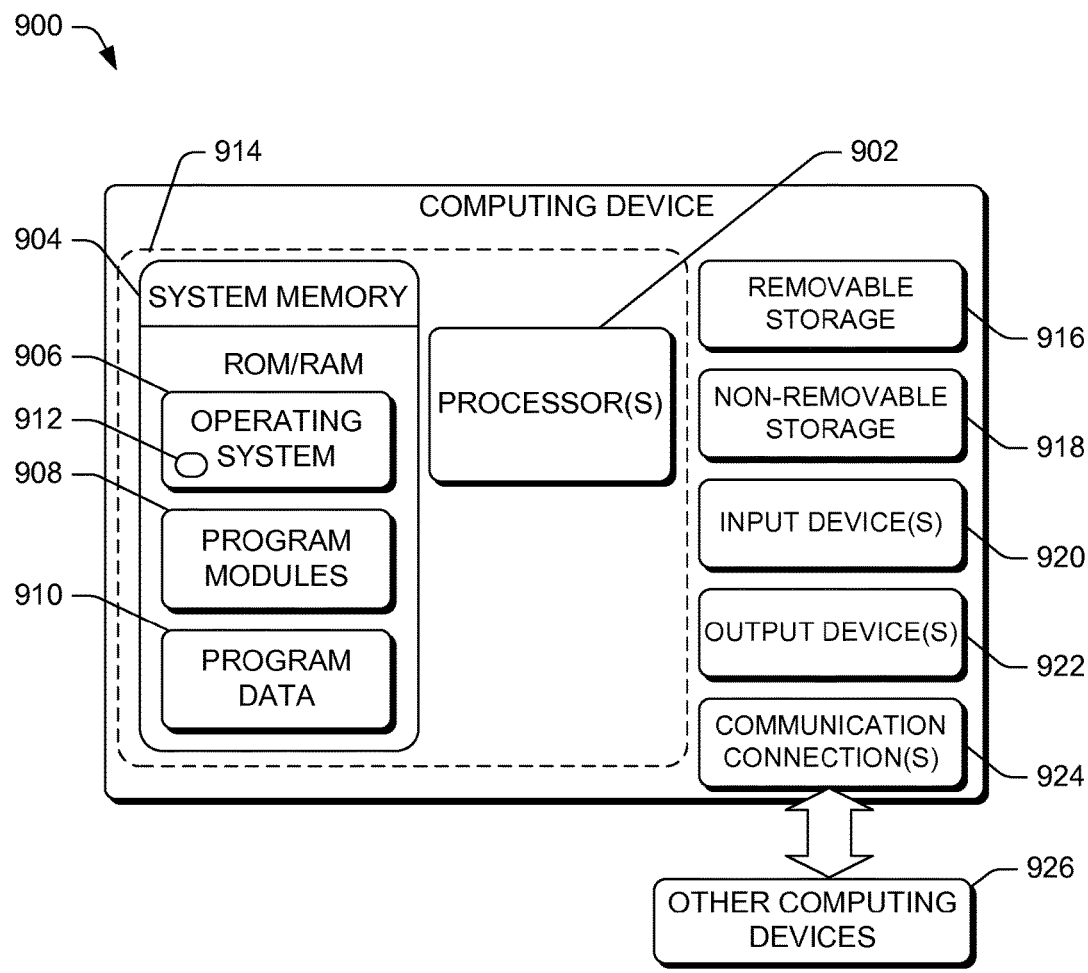
FIG. 9 is a block diagram of an illustrative computing device that may be used to implement the architecture of FIG. 1.

FIG. 9 is a block diagram of an illustrative computing device 900 that may be used to implement the architecture 100 of FIG. 1. The various embodiments of synonym identification techniques and mechanisms may be implemented in other computing devices, systems, and environments. The computing device 900 shown in FIG. 9 is only one example of a computing device and is not intended to suggest any limitation as to the scope of use or functionality of the computer and network architectures.

In a very basic configuration, the computing device 900 typically includes at least one processor 902 and system memory 904. Depending on the exact configuration and type of computing device, the system memory 904 may be volatile (such as RAM), non-volatile (such as ROM, flash memory, etc.) or some combination of the two. The system memory 904 typically includes an operating system 906, one or more program modules 908, and may include program data 910. The operating system 906 includes a component-based framework 912 that supports components (including properties and events) such as, for example, objects, inheritance, polymorphism, reflection, and provides an object-oriented component-based application programming interface (API). The computing device 900 in this example is of a very basic configuration demarcated by a dashed line 914.

A terminal may have fewer components but will interact with a computing device that may have such a basic configuration.

The computing device 900 may have additional features or functionality. For example, the computing device 900 may also include additional data storage devices (removable and/or non-removable). Such additional storage is illustrated in FIG. 9 by removable storage 916 and non-removable storage 918. Computer storage media may include volatile and nonvolatile, removable and non-removable media implemented in any method or technology for storage of information, such as computer readable instructions, data structures, program modules, or other data. The system memory 904, the removable storage 916, and the non-removable storage 918 are all examples of computer storage media. The computing device 900 may also have input device(s) 920 (e.g., keyboard, etc.) and output device(s) 922 (e.g., display, etc.).

The computing device 900 may also contain communication connections 924 that allow the device to communicate with other computing devices 926 (e.g., the data server(s) 118, etc.), such as over the network 108. The network(s) 108 may include wired networks as well as wireless networks. The communication connections 924 are one example of communication media. The communication media may typically be embodied by computer readable instructions, data structures, program modules, etc.

The illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like. For example, some or all of the components of the computing device 900 may be implemented in a data center or cloud computing environment, such that resources and/or services are made available via a computer network for selective use by client devices.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method of archiving a composite object, the method comprising:
   monitoring, by one or more processors of one or more computing devices, interactions by a user with an application to identify content associated with the interactions by the user with the application;
   identifying, by the one or more processors of the one or more computing devices and based on the monitoring, an item to be archived, the item comprising at least a portion of the content associated with the interactions by the user with the application and being related to one or both of an email event or a calendar;
   analyzing, by the one or more processors, the item based on a schema to determine whether the item has a semantic association with an other item, the item and the other item being results of a series of related computing activities that are user-initiated, and the schema including a set of instructions to identify items for archival;
   determining that the item has a semantic association with the other item in the composite object based on the set of instructions and characteristics of data associated with the item;
   associating the item with the other item in the composite object based on machine learning, preferences of other users, or heuristics;
   modifying, by the one or more processors, content of the composite object to archive the item;
   generating, by the one or more processors, a name for the item using one or both of the metadata of the item or attributes of the item; and
   transmitting, by the one or more processors, the item in the composite object to a storage device for storage in a composite object archive, the item and the other item being stored together on the storage device as the composite object.

2. The method as recited in claim 1, wherein the storage device is included in an object store having a policy engine, the policy engine to schematize the composite object for retrieval.

3. The method as recited in claim 1, wherein the schema further packages items in the composite object prior to transmission to the storage device.

4. The method as recited in claim 1, further comprising populating metadata of the composite object with the metadata from the item.

5. The method as recited in claim 1, wherein the analyzing the item includes matching metadata of the items to metadata in the schema to identify matching metadata, and determining based on the matching metadata that the item is to be included in the composite object.

6. The computer-implemented method of claim 1, wherein the application comprises at least one of an email application, a calendar application, a web-browser, or a video player.

7. A computer-implemented system comprising:
   one or more processors;
   memory to store computer readable instructions executable by the one or more processors;
   a schema agent stored in the memory and configured to:
      monitor computing actions that are user-initiated to identify items based on a set of instructions, wherein the items are related to on one or both of an email event or a calendar event;
      determine that the items have a semantic association with each other;
      designate the items for storage together as a composite object based on machine learning, preferences of other users, or heuristics; and
      migrate metadata of the items to the composite object to identify the composite object for retrieval, the retrieval of the composite object including retrieval of the items stored as the composite object; and
   a snapshot manager stored in the memory and configured to:
      obtain a screenshot of at least one item of the items for storage in the composite object, wherein the at least one item comprises content accessed by a user; and
      designate the screenshot as an item for archival with the items as the composite object.

8. The system as recited in claim 7, wherein the at least one item of the screenshot includes a website data item located remote from the memory.

9. The system as recited in claim 7, wherein the memory further stores a policy engine configured to:
designate a storage type of each of the items in the composite object; and
store the composite object for retrieval at a later point in time.

10. The system as recited in claim 7, wherein an originating storage location of one of the items is different than an originating storage location of another of the items.

11. The system as recited in claim 7, further comprising:
a policy engine stored in the memory and configured to store the composite object in an object store that is located remote from the computer-implemented system.

12. The system as recited in claim 7, wherein the memory stores a user interface module configured to cause a display of the stored composite object using a substantially chronological feed that lists one or more of the items in the composite object.

13. One or more computer-readable storage devices storing computer-executable instructions configured to be executed on one or more processors to cause the one or more processors to perform acts comprising:
monitoring interactions by a user with an application operating on a computing device to identify items associated with the interactions by the user with the application;
identifying an item of the items to be stored, the item related to on one or both of an email event or a calendar event;
extracting item data from the item, the item data including one or both of metadata or attributes of the item;
identifying, based on the item data matching item data of a schema, the item as having a semantic association with one or more other items of a pre-existing composite object, the schema using a machine learning based approach, preferences of other users, or heuristics to identify items for archival; and
storing the item together with the one or more other items of the pre-existing composite object in a storage media based on a storage policy.

14. The one or more computer-readable storage devices as recited in claim 13, wherein the acts further comprise replacing a redundant item in the storage media with a pointer mapped to a duplicate copy of the item.

15. The one or more computer-readable storage devices as recited in claim 13, wherein the schema includes instructions that are generated via an ontological analysis of item groupings from other users that interact with items of a same type as the item.

16. The one or more computer-readable storage devices as recited in claim 13, wherein the acts further comprise creating an identifier for the item using the item data.

17. The one or more computer-readable storage devices as recited in claim 13, wherein the acts further comprise indexing the pre-existing composite object with the item data to identify the composite object for retrieval.

18. The one or more computer-readable storage devices as recited in claim 13, wherein the computer-readable media is stored on a client computing device and the computer-executable instructions are executed locally to store the pre-existing composite object in local memory.

* * * * *